United States Patent
Wilson-Jones et al.

(10) Patent No.: US 8,751,111 B2
(45) Date of Patent: Jun. 10, 2014

(54) CONTROLLING MOTORS IN ELECTRIC POWER ASSISTED STEERING SYSTEMS

(75) Inventors: Russell Wilson-Jones, Stratford-upon-Avon (GB); Anthony Walter Burton, Solkihull (GB)

(73) Assignee: TRW Limited, West Midlands (GB)

( * ) Notice: Subject to any disclaimer, the term of this patent is extended or adjusted under 35 U.S.C. 154(b) by 1374 days.

(21) Appl. No.: 12/517,910

(22) PCT Filed: Dec. 7, 2007

(86) PCT No.: PCT/GB2007/004698
§ 371 (c)(1), (2), (4) Date: Sep. 22, 2010

(87) PCT Pub. No.: WO2008/071926
PCT Pub. Date: Jun. 19, 2008

(65) Prior Publication Data
US 2011/0010054 A1  Jan. 13, 2011

(30) Foreign Application Priority Data
Dec. 9, 2006 (GB) .................................. 0624597.1

(51) Int. Cl.
| | |
|---|---|
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |
| G06F 19/00 | (2011.01) |

(52) U.S. Cl.
USPC .......................................................... 701/42

(58) Field of Classification Search
USPC .......................................................... 701/42
See application file for complete search history.

(56) References Cited

U.S. PATENT DOCUMENTS

| | | | |
|---|---|---|---|
| 6,131,693 A | 10/2000 | Mukai et al. | |
| 6,212,453 B1 | 4/2001 | Kawagoe et al. | |

(Continued)

FOREIGN PATENT DOCUMENTS

| | | |
|---|---|---|
| DE | 10142366 A1 | 3/2003 |
| WO | 0202389 A1 | 1/2002 |

OTHER PUBLICATIONS

International Search Report for PCT/GB2007/004698 dated Apr. 9, 2008.

*Primary Examiner* — Maceeh Anwari
(74) *Attorney, Agent, or Firm* — MacMillan, Sobanski & Todd, LLC

(57) ABSTRACT

A method of controlling an electric motor in an electric power assisted steering system, the motor being arranged so as to apply a force to part of a steering mechanism of a vehicle, in which the method comprises calculating a force demand indicative of an assistance force dependent upon the torque applied by a user ($T_D$) to the steering mechanism that it is to be applied to the steering mechanism to reduce the exertion required by the user to steer the vehicle; combining the force demand with an overlay force demand ($T_{ER}$) indicative of a force which it is desired to overlay over the assistance force, to generate a combined assistance force ($T_A$); and controlling the motor according to the combined assistance force, such that together with the force applied by the user, a total force is applied to the steering mechanism, in which, in order to generate the combined assistance force the torque applied by the user is subjected to a non-linear boost function and in which the overlay force demand is combined with the force demand such that, for an arbitrary change in the overlay force demand the change in the total force is independent of the torque applied by the user over a range of torques applied by the user.

29 Claims, 8 Drawing Sheets

(56) References Cited

U.S. PATENT DOCUMENTS 6,640,923 B1 11/2003 Dominke et al.
2007/0001510 A1* 1/2007 Miller ......................... 303/149
2007/0233344 A1 10/2007 Satake

* cited by examiner

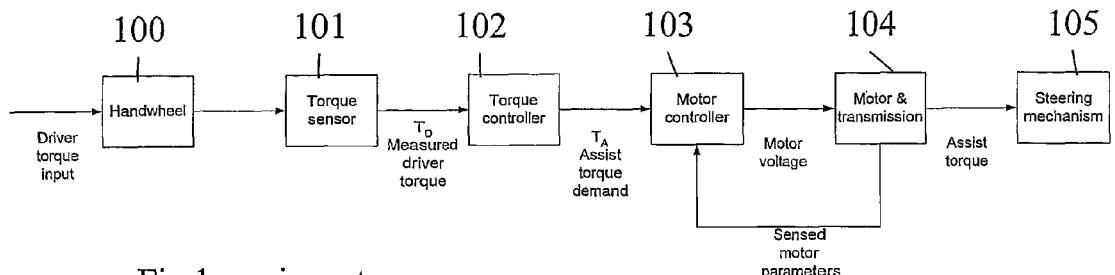
Fig 1 – prior art
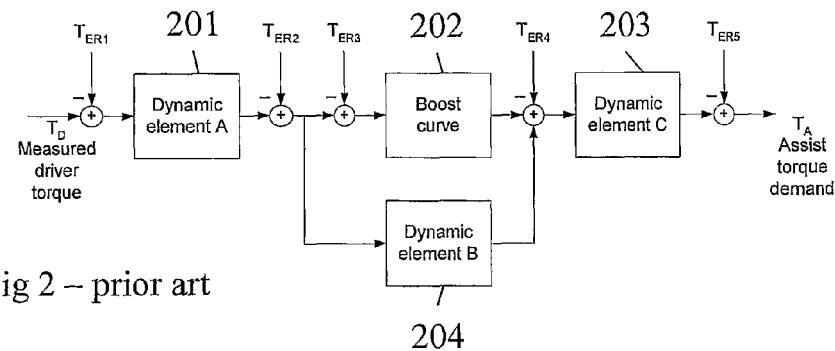
Fig 2 – prior art
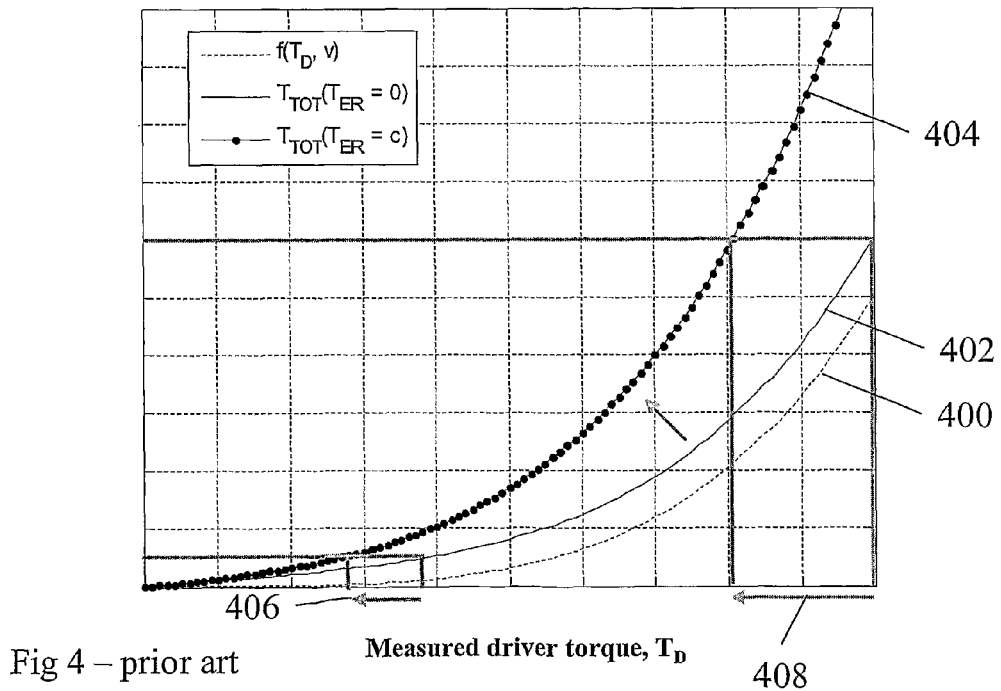
Fig 4 – prior art

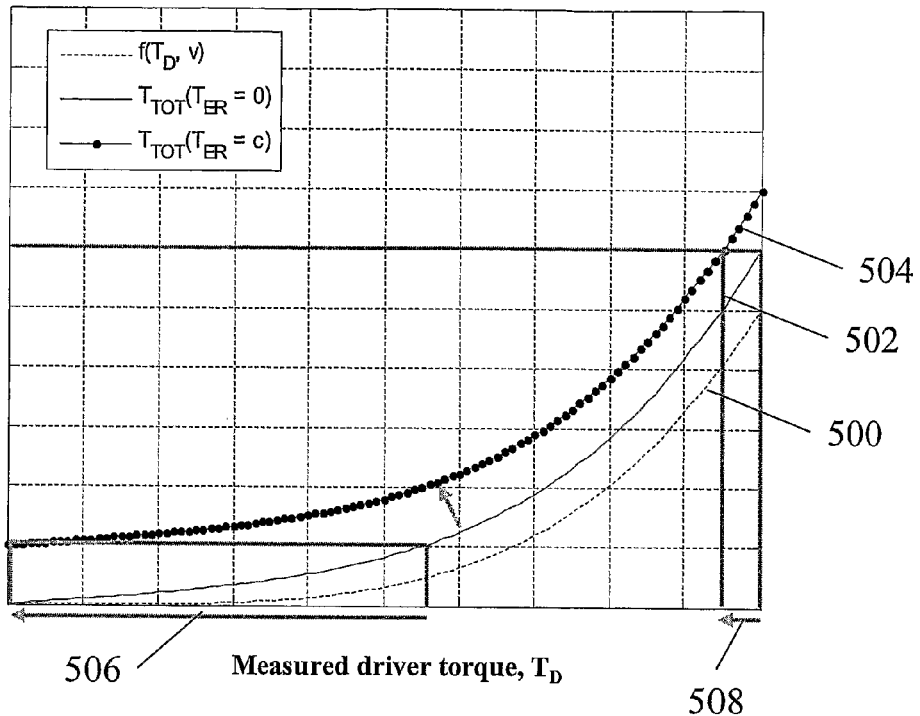
Fig 5 – prior art
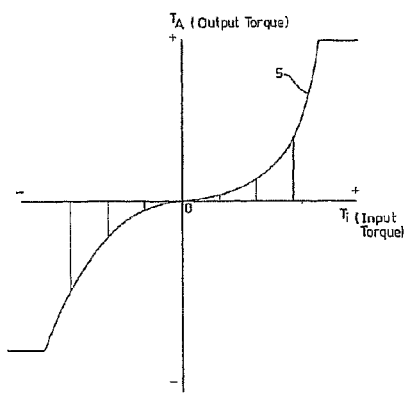
Fig 3a – prior art
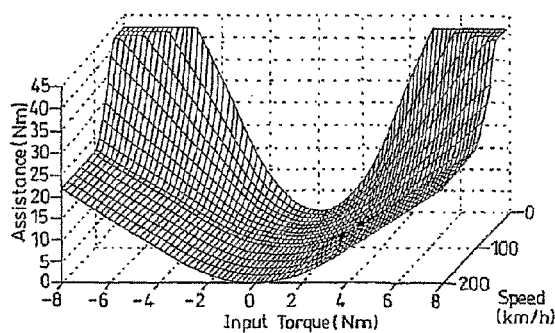
Fig 3b – prior art

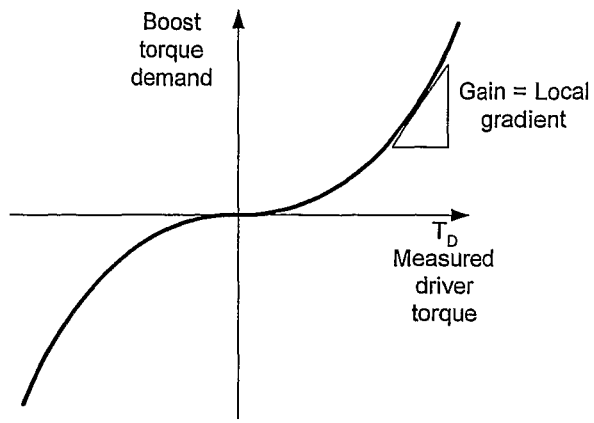
Fig 10
Fig 16
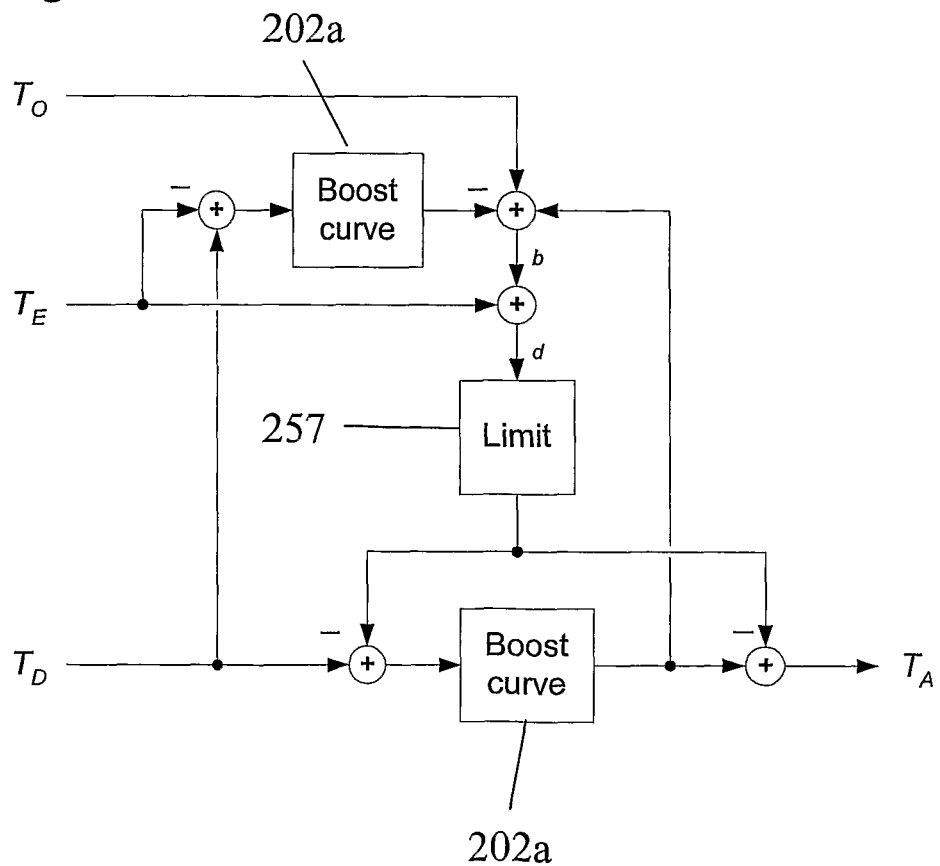

CONTROLLING MOTORS IN ELECTRIC POWER ASSISTED STEERING SYSTEMS

CROSS-REFERENCE TO RELATED APPLICATIONS

This application is a national stage of International Application No. PCT/GB2007/004698 filed Dec. 7, 2007, the disclosures of which are incorporated herein by reference in their entirety, and which claimed priority to Great Britain Application No. 0624597.1 filed Dec. 9, 2006, the disclosures of which are incorporated herein by reference in their entirety.

BACKGROUND OF THE INVENTION

This invention relates to a method of controlling a motor in an electric power assisted steering system.

Electric power assisted steering (EPAS) systems are well known in the prior art. Generally, the steering mechanism of a vehicle couples rotational movement of a steering wheel into movement of the road wheels of the vehicle. An electric motor can be used to assist the driver with the movement of the wheels by applying a torque to the system that is coupled into the steering mechanism. A torque sensor in part of the steering mechanism indicates the torque being input to the steering mechanism by the driver; the system uses this to determine how much assistance torque to apply using the motor.

A standard, prior art, EPAS system can be seen in FIG. 1 of the accompanying drawings. Typically, the driver controls the steering via a handwheel 100. A torque sensor 101 is provided, as discussed above, in the steering mechanism of a vehicle; typically this could be located in the handwheel, steering column or pinion assembly. This produces a torque signal $T_D$ indicative of the torque applied to the steering mechanism by the driver. The torque controller 102 uses $T_D$ to generate an assistance torque demand $T_A$. This assistance torque $T_A$ is indicative of a force to be generated by the motor in order to assist the driver with turning the steering wheel in order to move the road wheels 105.

The assistance torque thus generated is generally scaled so that it represents the reduction that is to be achieved in the torque in the steering column and thus the assistance to the driver. The assistance torque $T_A$ is generally dependent upon not only the measured torque $T_D$ but also the vehicle speed. Furthermore, the assistance torque $T_A$ is generally boosted from the measured torque $T_D$ by a non-linear boost function, such as is described in European Patent Application publication no EP 0 947 413.

In the motor controller circuit 103, the assistance torque demand $T_A$ is converted into a set of signals for controlling the motor 104 so that it produces an amount of torque proportional to the assistance torque demand $T_A$ but scaled by factors depending on the mechanical connection of the motor to the steering mechanism; for example, the mechanical ratio of any gearbox used, the mechanical polarity of the gearbox and the efficiency of the mechanical driveline. In some cases, the steering ratio is a non-linear function of the steering angle; in these instances, it is possible to schedule the calculation according to a measurement of steering angle. In other cases it may be desirable to compensate the conversion between $T_A$ and the motor control variables by other parameters that are known to affect the physical parts, for example the motor temperature.

In general, a steering system may comprise a number of transformations between linear (or quasi-linear) motion and rotary motion. Typically in a steering system with a rack & pinion steering gear, the driver will apply a force to the rim of a handwheel that is translated into a torque in the steering column. This torque is substantially transmitted to the pinion of the steering gear (there is some modulation and frictional loss in the intermediate shaft). The rack and pinion mechanism translates the applied pinion torque into a rack force. The rack force is then substantially coupled into the steering arms of the road wheel hubs by a linkage (there can be modulation of the forces by the kinematics of the suspension).

The steering arms translate the linkage forces into a torque that is substantially applied along the steering axis of the suspension and hence onto the contact patch between the tyre and road. An electric power assisted steering (EPAS) system typically measures the input torque applied to the handwheel, column or pinion; and applies assistance power via a mechanism on the column, pinion, steering gear or directly about the road wheel steering axis.

It is possible to relate the various forces in the system to the various torques in the system according to the physical dimensions of the active parts in the mechanism. Similarly the electro-motive force from the assistance motor can be substantially related back to an equivalent torque that is applied on the handwheel. Whereas "force" has been used throughout, we include in that term both linear forces and rotational torques. However, in some embodiments it may be desirable to limit the invention to one or the other. Furthermore, it will be recognised that these quantities can be represented in units that are comparable; therefore this description does not consider the scale factors that are necessary to achieve equivalence.

It is also known, for example from the European Patent Application published as EP 0 640 903, that other controller functions can generate torque demands. These include damping control, active return control and feedback from systems such as lane guidance systems. These generally provide a torque "overlay"; that is, an extra torque offset that is to be added or subtracted from the assistance torque.

Due to the recent proliferation of EPAS systems and electronic control systems in vehicles such as cars in general, there is a growing desire to integrate torque request signals generated from external sources and include them as part of the overall EPAS torque generation process.

In general such external torque requests can be split into 2 cases:

a) those that are introduced with the intention of modifying the handwheel torque that is perceived by the driver, for example, to apply a bias to the driver's steering effort. This will be referred to as "driver overlay".

b) Those that are introduced with the aim of compensating for disturbances or other physical loads applied to the steering system. For example, the vehicle chassis may transmit unwanted forces into the steering system that can be estimated and directly opposed by the additional torque from the motor. These requests shall be referred to as "output overlay" since the output of the actuator is the important part.

The nonlinear boost curve in the EPS system causes the assistance torque to be non-linearly related to the driver torque. Hence a driver overlay torque will be non-linearly related to the assistance torque and the output overlay torque. It is usually desirable for any torque overlay strategy to limit the amount of driver torque that is needed to overcome the torque demand from other vehicle control systems.

We can therefore identify at least two problems that may be solved:

i) to modify the assistance torque demanded by the normal controller in a way to give a consistent driver overlay independently of the nonlinear boost curve setting, and ii) to introduce an output overlay torque that is limited in terms of the size of change in the torque that the driver must apply to the handwheel to overcome it.

BRIEF SUMMARY OF THE INVENTION

An object of the invention is at least to partially ameliorate any problems with prior art systems (be they the problems identified above or others).

According to a first aspect of the invention, there is provided a method of controlling an electric motor in an electric power assisted steering system, the motor being arranged so as to apply a force to part of a steering mechanism of a vehicle, in which the method comprises calculating a force demand indicative of an assistance force dependent upon the torque applied by a user to the steering mechanism that it is to be applied to the steering mechanism to reduce the exertion required by the user to steer the vehicle;

combining the force demand with an overlay force demand indicative of a force which it is desired to overlay over the assistance force, to generate a combined assistance force; and controlling the motor according to the combined assistance force, such that together with the force applied by the user, a total force is applied to the steering mechanism, in which, in order to generate the combined assistance force the torque applied by the user is subjected to a non-linear boost function and in which the overlay force demand is combined with the force demand such that, for an arbitrary change in the overlay force demand the change in the total force is independent of the torque applied by the user over a range of torques applied by the user.

Such a system gives a consistent feel to the user of such a system—typically the driver of the vehicle—regardless of what effort they are currently putting into the system. The applicants have realised that unless the change in the total force is kept independent of the torque applied by the user, then the effect of a given change in the overlay force demand will lead to a different feel to the user at different input torques. This is undesirable, as it will make the steering behave differently at different amounts of steering effort.

In the preferred embodiment, the step of generating the combined assistance force comprises combining the torque applied by the user with a first component of the overlay force demand to form a first intermediate value, applying the non-linear boost function to the first intermediate value to form a second intermediate value and combining the second intermediate value with a second component of the overlay force demand.

This has been found to be a particularly convenient way to achieve a consistent driver feel. Typically, either or both of the combinations of the user-applied torque and the first component on the one hand and the second intermediate value and the second component on the other may comprising additively combining the values to be combined, for example by adding or subtracting. The components may be the same.

The method may also comprise applying dynamic elements to the calculation of the combined assistance force. Dynamic elements correct the dynamic response of the steering system and include such features as damping and the like. Dynamic elements may be applied to any of the user applied torque, the first intermediate value, the second intermediate value and may also form part of the boost function; they may depend on a rate of change of the variable on which they are operating. Preferably, the dynamic elements, especially those that are in series with the non-linear boost function, have a gain of unity at low or zero frequency; otherwise, the dynamic elements may comprise a gain correction to scale the values in question by an inverse gain.

In general, the overlay force demand represents a force that is to be added or subtracted from the assistance force that would otherwise be generated from the user-applied torque. However, in some cases, the overlay force demand may comprise an override force value to be applied to the steering mechanism that may be independent of the user-applied torque. In such a case, the method may include the step of comparing the torque applied by the user and the override force value. Typically, the method includes the step of limiting the difference between the override force value and the user-applied torque. The limit may be variable.

The overlay force demand represents a change in the force that is felt by the driver. Thus, when the first and second intermediate values are used, it is possible to exactly limit the change in the force felt by the driver. This is important in cases when it is necessary to be able to demonstrate that another control system has limited authority over the normal EPAS steering control. Such a limited override system is useful, as it allows the torque to be controlled by another system of the vehicle, but only up to a limit. Furthermore, the application of this limit may be consistent across the range of applied user applied torques. This method has been found to operate particularly efficiently with the operation of the first and second intermediate values discussed above.

In an alternative, the method may comprise limiting the difference between the assistance force and the total force. This is useful to ensure that the user is able to override any overlay force: the total disparity between what the user intends to apply and what the systems demanding overlay forces wish to apply is limited. Furthermore, it is useful to be able to prove that a given system is limited. Where multiple systems interact and demand different overlay forces, simply limiting the amount of change they can make to the total force to a value that is determined to have no or little hazardous effects on the vehicle means that it is not necessarily required to investigate how all the different systems interact.

The method may also include the step of varying the limit. Preferably, the method may include the step of setting the limit to zero when it is desired to disable the control of the combined assistance force by the override force value.

The method may also comprise the raising of a flag when the limit is in operation. This may allow for notification of the circuit setting the override force demand that its demand has not been achieved.

Furthermore, the method may comprise the step of determining the override force value dependent upon a desired steering angle for the steering mechanism. This is useful in the case where some circuit of the vehicle, such as a parking controller, roll stability controller, autonomous guidance system or collision avoidance system wishes to control the angle at which the vehicle's road wheels are oriented. Where the limiting of the torque applied by the method due to the override force value is implemented, the driver of the vehicle can still override the angle demand—they will simply feel a maximum bias equivalent to the limit. Accordingly, such a system allows for angle control of the steering whilst still allows a driver to override the system if they so desire. The actual steering angle may be measured or estimated as the angle at the roadwheels, the angle at the handwheel, or the angle at some pre-determined intermediate part of the steering mechanism.

The calculation of the override force value based on the desired steering angle may depend on the difference between the desired steering angle and the actual steering angle of the vehicle. Furthermore, the limit may be varied depending on any of the desired angle or the difference between the desired and actual angles, or the vehicle speed.

The desired steering angle may also have a demand strength associated therewith; in such a case the limit may also depend on the demand strength, such that when the demand strength is high, the limits on the override force demand are relatively high (that is, the override force may take a wide range of values and so may have a relatively large effect), whereas if the demand strength is low, the limit may be set low and so the override force may be allowed to have little effect. When the demand strength is zero, the limit may be zero, which may have the effect described above of disabling the override force.

The limit may depend on how the demand strength changes with time; typically, it may depend on the integral of the demand strength over a moving time window. The limit on the override force may be non-symmetrical and so may be biased according to the direction of the angle demand relative to the actual steering angle.

The method may further comprise combining a plurality of different angle demands to form the desired steering angle. Each of the angle demands may have a demand strength associated therewith; the method may also comprise the step of determining an overall angle demand strength based on the demand strengths of the angle demands. This allows competing angle demands to be combined together so that different circuits can compete to set the desired angle.

In an alternative embodiment, the step of generating the combined assistance force comprises applying a scaling factor to the overlay force demand dependent upon the rate of change of the boost function with respect to the torque applied by the user before the overlay torque demand is combined with the user-applied torque. The scaling factor may be of the form of a constant plus the rate of the change of the boost function, the constant preferably being 1; this may then advantageously give approximately the same result as the "dual inject" method. The scaled value of the overlay force demand may be combined with the user-applied torque after the user-applied torque has been boosted by the non-linear boost function.

In a yet further embodiment, the method may comprise calculating an overlay force based upon the overlay force demand and the measured driver torque. This can be combined with the torque applied by the user, to which combination there can be applied the non-linear boost function, or alternatively the user applied torque can be the subject of the non-linear boost function before the calculated overlay force is combined into this boosted user applied torque.

The range of torques may comprise any torque that is applied to the system by the user. Alternatively, it may comprise a smaller range, typically that which a user may apply to the system in normal use.

Any of the forces referred to above may be linear forces or torques. Commonly, the forces within a steering system are in the majority rotational, so all of the forces to which we have referred may be torques.

Preferably, the overlay force demand is independent of the torque a user is applying to the system. This reduces the computational load on the circuits generating the overlay torque demand, as the method according to the invention will mean that the effect of the overlay torque demand will be corrected to be consistent across the range.

The boost function may be a function of the vehicle speed.

The method may also comprise calculating the combined assistance force dependent upon an output overlay demand indicative of a further force which it is desired to overlay over the assistance force and the force due to the overlay force demand, such that for an arbitrary change in the output overlay demand the change in the total force is substantially independent of the non-linear function.

This therefore allows for the use of the known output torque overlay technique in combination with the current invention. Furthermore, it allows simulation of the known output torque overlay technique for interactions with other systems on the vehicle that require output torque overlay.

When an output overlay is combined with a driver overlay, it is desirable to limit the total torque that the driver must apply to overcome the joint effect of more than one overlay demand.

Where the first and second intermediate values are employed, the method may comprise converting the output overlay demand to a simulated overlay or equivalent overlay force demand and combining that with the overlay force demand before the overlay force demand is used to determine the first and second intermediate values, such that the equivalent overlay force demand represents the change in the overlay force demand necessary to generate change in the total force that is substantially independent of the non-linear function. Given that the non-linear function is applied to the overlay force demand, this may be considered to be counteracting the effect of the non-linear function on the output overlay demand.

The equivalent overlay force demand may represent the change in the overlay force demand necessary to generate change in the total force that is independent of the non-linear function; that is, the conversion is an entirely accurate inversion on the non-linear function's effects. However, this tends to be mathematically complex and so undesirable to implement with the limited processing power available on a vehicle. In such a case, an approximation may be made.

One possible approximation can include a term:

$$T_E \approx \frac{T_O}{1+g},$$

where $T_E$ is the equivalent overlay force demand, $T_O$ is the output overlay demand and $g$ the gain of the non-linear function for the torque that the user is applying.

The combination of the overlay force demand and the equivalent overlay force demand may be additive, to form a total overlay force demand; the combination may comprise adding the overlay force demand and the equivalent overlay force demand together. The combination may comprise limiting the total overlay force demand.

In an alternative also using the first and second intermediate values, the method may comprise limiting the output overlay demand before it is used to form the second, but not the first components. This can be considered to be direct output torque overlay, with a limit. The limit may be a constant, which will be generally set conservatively at the worst-case limit. The overlay torque demand may be separately limited; its limit may also be a constant.

The limit on the output overlay demand may be a function of the gain of the non-linear function for the present value of torque applied by the user. As the gain of the non-linear function will affect the effect of the output overlay demand, the inventors have realised that the perhaps overly conservative constant limit suggested above can be varied depending upon the non-linear function. Typically, the limit on the output overlay demand may be proportional to, or contain a term proportional to (1+g), where g is the gain, specifically typically the local gain of the non-linear function. The limit may be $(1+g)\Delta T_{D(max)}$, where $\Delta T_{D(max)}$ is the maximum desired handwheel perturbation.

In a further alternative, the non-linear function is applied separately to the first intermediate value, to form the second intermediate value, and to a combination of the torque applied by the user and the overlay force demand, to form a third intermediate value, which is used to calculate the first and second components of the overlay force demand. The combination may represent the difference between the torque applied by the user and the overlay force demand. The output overlay demand may also be combined with the third intermediate value in order to determine the first and second components of the overlay force demand.

In such a case, the first and second components of the overlay force demand, which may be equal, may be limited. This represents a direct limit on the overlay force applied to the steering system.

When the limits are inoperative, the action of the two non-linear functions may cancel out their effects on the output overlay demand. Accordingly, the first and second components may comprise the sum of the overlay force demand, the second intermediate value and the output overlay demand less the third intermediate value.

According to a second aspect of the invention, there is provided an electric power assisted steering system, comprising a steering wheel, a steering mechanism which operatively couples the steering wheel to road wheels of a vehicle, a electric motor being arranged so as to apply in use a force to part of the steering mechanism, a torque sensor which, in use, provides a torque signal indicative of the torque carried by part of the steering mechanism and a control unit arranged to control the motor by generating, in use, a force demand signal indicative of an assistance force, dependent upon the torque signal, that is to be applied to the steering mechanism to reduce the exertion required by the user to steer the vehicle, in which the control unit has an input for the torque signal and an input for an overlay force demand signal being indicative of a force which it is desired to overlay over the assistance force, in which the control unit comprises a boost unit, arranged to apply a non-linear boost function to the torque signal, and in which the control unit is operable, in use, to combine the torque signal and the overlay force demand signal to create a combined assistance force signal such that the motor is controlled, in use, so that a total force comprising the combined assistance force and the force applied by a user is applied to the steering mechanism such that, for an arbitrary change in the overlay force demand signal the change in the total force is independent of the torque applied by the user over a range of values of the torque applied by a user.

In the preferred embodiment, the control unit comprises a first combination circuit arranged so as to, in use, combine the torque signal with a first component of the overlay force demand signal to form a first intermediate signal, a boost circuit arranged so as to, in use, apply the non-linear boost function to the first intermediate signal to form a second intermediate signal and a second combination circuit arranged so as to, in use, combine the second intermediate signal with a second component of the overlay force demand signal.

This has been found to be a particularly convenient way to achieve a consistent driver feel. Typically, either or both of the combination circuits may be arranged to additively combine the signals to be combined, for example by adding or subtracting. The control unit may be arranged to calculate the first and second components as the same value.

The control unit may also comprise at least one dynamic element, arranged so as to act upon the rate of change of the signals in the control unit. Such dynamic elements correct the dynamic response of the steering system and include such features as damping and the like. The or each dynamic element may be applied to any of the torque signal, the first intermediate signal, the second intermediate signal and may also form part of the boost function. Preferably, the dynamic elements have a gain of unity at low or zero frequency; otherwise, the dynamic elements may comprise a gain correction to scale the values in question by an inverse gain.

In general, the overlay force demand signal represents a force that is to be added or subtracted from the assistance force that would otherwise be generated from the user-applied torque. However, in some cases, the overlay force demand signal may comprise an override force value to be applied to the steering mechanism that may be independent of the torque signal. In such a case, the control unit may comprise a comparison circuit arranged so as to, in use compare the torque signal and the overlay force demand signal. The control unit may also comprise a limiter, arranged so as to, in use, limit the difference between overlay force demand signal and the torque signal. The control unit may comprise an input for a variable limit for the limiter.

Such a limited override system is useful, as it allows the torque to be controlled by another system of the vehicle, but only up to a limit. Furthermore, the application of this limit is consistent across the range of applied user applied torques. This system has been found to operate particularly efficiently with the operation of the first and second intermediate signals discussed above.

In an alternative, the steering system may comprise a difference limiter arranged to limit the difference between the assistance force and the total force. This is useful to ensure that the user is able to override any overlay force, in that the total disparity between what the user intends to apply and what the systems demanding overlay forces wish to apply is limited. Furthermore, it is useful to be able to prove that a given system is limited. Where multiple systems interact and demand different overlay forces, simply limiting the amount of change they can make to the total force to a value that is determined to have no or little hazardous effects on the vehicle means that it is not necessarily required to investigate how all the different systems interact.

The control unit may be arranged such that setting the limit to zero, in use, disables the control of the combined assistance force signal by the overlay force demand signal.

The limiter may also be arranged to, in use, raise a flag when the limit is in operation. This may allow for notification of the circuit setting the override force demand that its demand has not been achieved.

Furthermore, the control unit may comprise an override force signal calculating circuit having an input for a desired steering angle and arranged so as to calculate in use, the override force value for the steering mechanism dependent on the desired steering angle. This is useful in the case where some circuit of the vehicle, such as a parking controller, roll stability controller, autonomous guidance system or collision avoidance system wishes to control the angle at which the vehicle's road wheels are oriented. Where the limiter is implemented, the driver of the vehicle can still override the angle demand—they will simply feel a maximum bias equivalent to the limit. Accordingly, such a system allows for angle control of the steering whilst still allows a driver to override the system if they so desire.

The system may further comprise a steering angle sensor arranged to generate, in use, a steering angle signal dependent on the steering angle of the vehicle, and the control unit may comprise an angle differencing circuit arranged to take as inputs the steering angle signal and the desired steering angle and to, in use, calculate and output a angle difference signal indicative of the difference between the desired steering angle and the actual steering angle of the vehicle; the override force calculating circuit may take this signal as an input and, in use, use the signal in calculating the override force value. Furthermore, the limiter may be arranged to vary the limit, in use, depending on any of the desired steering angle, the difference signal or the vehicle speed signal.

The control unit may also have an input for a demand strength signal associated with the desired steering angle; in such a case, the limiter may take this signal as an input and, in use, vary the limit on the demand strength signal. When the demand strength signal is zero, the limit may be zero, which may have the effect described above of disabling the override force.

The limiter may be arranged to vary the limit in use depending on the change in the demand strength signal with time; typically, it may comprise an integrator for the demand strength signal, arranged so as to, in use, integrate the demand strength signal over a moving time window. The limit on the override force may be non-symmetrical and so may be biased according to the direction of the angle demand relative to the actual steering angle.

The control unit may further comprise an angle arbitration circuit having a plurality of different angle demand inputs and arranged to combine, in use, angle demand signals at each input to form the desired steering angle. The angle arbitration circuit may also comprise an input for a plurality of demand strengths associated with the plurality of angle demands; the arbitration circuit may also be arranged so as to, in use output an overall angle demand strength signal based on the demand strengths of the angle demands. This allows competing angle demands to be combined together so that different circuits can compete to set the desired angle.

In an alternative embodiment, the control unit comprises a scaling circuit arranged to apply a scaling factor, in use to the overlay force demand signal, dependent upon the rate of change of the boost function with respect to the torque signal before the overlay torque demand signal is combined with the user-applied torque signal. The scaling factor may be of the form of a constant plus the rate of the change of the boost function, the constant preferably being 1. The control unit may be arranged such that the scaled overlay force demand signal is combined with the torque signal after the torque signal has been boosted.

In a yet further embodiment, the control unit may comprise an overlay force calculator arranged to calculate an overlay force signal indicative of an overlay force to be applied to the steering mechanism, based upon the overlay force demand signal and the torque signal. The control unit may then further comprise a combination unit arranged to combine the overlay force signal with the torque signal, the output of which may then be operatively coupled to an input of the boost circuit. Alternatively, the torque signal may be passed through, in use, the boost circuit before the overlay force signal is combined in the combination circuit with the boosted torque signal.

The range of torques may comprise any torque that is applied to the system by the user. Alternatively, it may comprise a smaller range, typically that which a user may apply to the system in normal use.

Any of the forces referred to above may be linear forces or torques. Commonly, the forces within a steering system are in the majority rotational, so all of the forces to which we have referred may be torques.

Such a system allows the overlay force demand signal to be independent of the torque a user is applying to the system. This reduces the computational load on the circuits generating the overlay torque demand signal, as the effect of the overlay torque demand will be corrected to be consistent across the range.

The control unit may comprise a microprocessor, arranged so as to carry out the functions of the circuits of the control unit.

The system may further comprise a speed sensor arranged to determine, in use, the speed of the vehicle and to generate a speed signal indicative of the speed. The boost circuit may comprise an input for the speed signal and the boost function may depend on the speed signal.

The control unit may also comprise an input for an output overlay demand indicative of a further force which it is desired to overlay over the assistance force and the force due to the overlay force demand, in which the control unit is arranged to calculate the combined assistance force dependent such that for an arbitrary change in the output overlay demand the change in the total force is substantially independent of the non-linear function.

This therefore allows for the use of the known output torque overlay technique in combination with the current invention. Furthermore, it allows simulation of the known output torque overlay technique for interactions with other systems on the vehicle that required output torque overlay.

Where the first and second combination circuits are employed, the control unit may comprise a conversion unit arranged to convert, in use, the output overlay demand to output a equivalent overlay force demand, and a third combination unit arranged to combine in use the output of the conversion unit and the overlay force demand to provide the inputs for the components of the overlay force demand to the first and second combination units, the conversion unit being arranged such that the equivalent overlay force demand represents the change in the overlay force demand necessary to generate change in the total force that is substantially independent of the non-linear function. Given that the non-linear function is applied to the overlay force demand, this may be considered to be counteracting the effect of the non-linear function on the output overlay demand.

The equivalent overlay force demand may represent the change in the overlay force demand necessary to generate change in the total force that is independent of the non-linear function; that is, the conversion is an entirely accurate inversion on the non-linear function's effects. However, this tends to be mathematically complex and so undesirable to implement on the limited processing power available on a vehicle. In such a case, the conversion unit may be arranged to make, in use, an approximation.

One possible approximation can include a term:

$$T_E \approx \frac{T_O}{1+g},$$

where $T_E$ is the equivalent overlay force demand, $T_O$ is the output overlay demand and g the gain of the non-linear function for the torque indicated by the torque signal.

The third combination unit may be arranged to combine the overlay force demand and the equivalent overlay force demand may be additive, to form a total overlay force demand; the third combination unit may be arranged to add the overlay force demand and the equivalent overlay force demand together. The third combination unit may be arranged to limit the total overlay force demand.

In an alternative also using the first and second intermediate values, the control unit may comprise a output overlay limiter arranged to limit the output overlay demand, the output of which is connected to the input of the second combination unit, but not necessarily the first combination unit. This can be considered to be direct output torque overlay, with a limit. The limit may be a constant, which will be generally set conservatively at the worst-case limit. The overlay torque demand may be provided with an overlay force limiter, arranged to limit the overlay torque demand in use and to provide the limited value to the first and second combination units; its limit may also be a constant.

The limit of the output overlay limiter may be a function of the gain, in use, of the non-linear function for the present value of the torque signal. As the gain of the non-linear function will affect the effect of the output overlay demand, the inventors have realised that the perhaps overly conservative constant limit suggested above can be varied depending upon the non-linear function. Typically, the limit on the output overlay demand may be proportional to, or contain a term proportional to $(1+g)$, where g is the gain, specifically typically the local gain of the non-linear function. The limit may be $(1+g)\Delta T_{D(max)}$, where $\Delta T_{D(max)}$ is the maximum desired handwheel perturbation.

The control unit may be provided with a further boost unit and a further combination unit, the further combination unit having inputs for and being arranged to combine the torque signal and the overlay force demand and to output the combined signal to the further boost unit, the further boost unit being arranged to apply the same non-linear function to its input as the boost unit employs to form a third intermediate value, and in which the control unit is arranged to calculate the first and second components dependent upon the third intermediate value. The further combination unit may be arranged to difference, in use, its inputs.

The control unit may also comprise a component limiter arranged to, in use, limit the values of the first and second components. This represents a direct limit on the overlay force applied to the steering system.

When the component limiter is inoperative, the action of the two non-linear functions may cancel out their effects on the output overlay demand. Accordingly, the control unit may comprise adding means arranged to, in use, calculate the first and second components as equal suns of the overlay force demand, the second intermediate value and the output overlay demand less the third intermediate value.

Other advantages of this invention will become apparent to those skilled in the art from the following detailed description of the preferred embodiments, when read in light of the accompanying drawings.

BRIEF DESCRIPTION OF THE DRAWINGS

FIG. 1 shows a schematic view of a prior art electric power assisted steering (EPAS) system;

FIG. 2 shows a block diagram showing prior art torque overlay approaches;

FIGS. 3a and 3b show boost curves used in prior art EPAS systems;

FIG. 4 shows a graph of the response of a prior art EPAS system using input torque overlay;

FIG. 5 shows a graph of the response of a prior art EPAS system using output torque overlay;

FIG. 10 shows the calculation of the gain of the boost curve in the embodiment of FIG. 9;

FIG. 16 shows a further embodiment which uses two identical boost curves to cancel out the effects of the boost curve on the output torque overlay components.

DETAILED DESCRIPTION OF THE INVENTION

Figure 7:
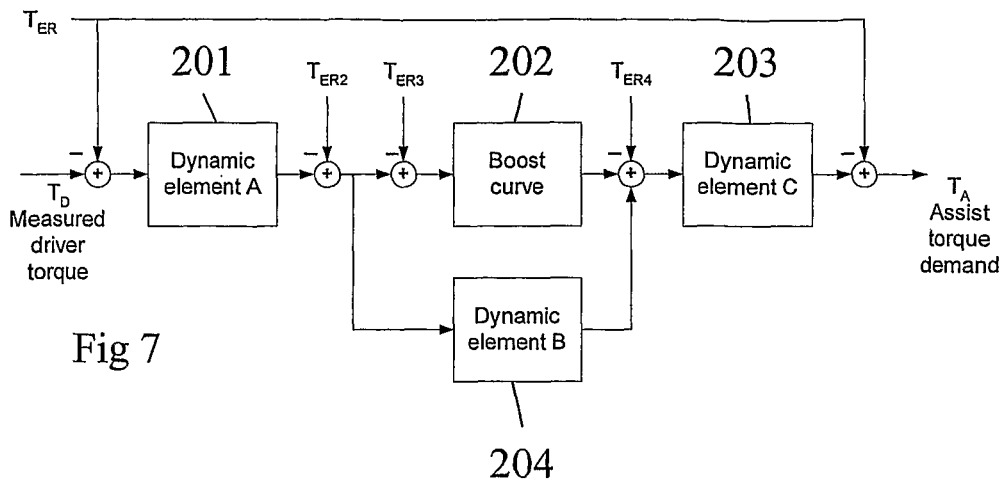
FIG. 7 shows the calculation of the assistance torque according to a first embodiment of the invention.

Existing torque overlay strategies involve simply injecting the externally generated torque request at either the input or the output of the normal EPS torque assistance generating function (in, for example, the torque controller 102 in FIG. 1 of the accompanying drawings). In normal operation, without any external torque demand, the assistance torque $T_A$ can be given as:

$$T_A = f(T_D, v)$$

where $T_D$ is the measured torque applied by the driver on the steering column, v is the vehicle speed and $f$ is a non-linear boost function. An example boost function can be seen in FIGS. 3a and 3b of the accompanying drawings, where FIG. 3a shows the boost curve for a single value of vehicle speed and FIG. 3b the boost curve over a range of speeds.

The prior art strategies can be depicted, using this notation and with $T_{ER}$ as the external requested torque overlay:

in the case of adding the overlay torque at the input of the torque generating function, $T_A = f(T_D - T_{ER}, v)$;

in the case of adding the overlay torque at the output of the torque generating function, $T_A = f(T_D, v) - T_{ER}$.

A block diagram showing these approaches can be seen in FIG. 2 of the accompanying drawings. The drawing also shows the use of dynamic elements 201, 202, 204 within the torque calculation; these react to time varying elements in the signals they process. For example, dynamic element 201 may comprise a low-pass filter arranged to filter out high-frequency changes in steering column torque, dynamic element 202 may comprise a notch filter arranged to damp oscillations at a resonant frequency of the steering system and dynamic element 204 may comprise a differentiator, a high-pass filter and a non-linear gain in order to improve the stability of the steering system. Whilst these details are not especially relevant to the invention, dynamic elements 201 and 204 should have gains of unity at zero frequency, whereas dynamic elements should have zero gain at zero frequency. In all cases, the gain of the dynamic elements will vary with vehicle speed.

Whilst we are, for the moment, generally interested in the steady state response of the steering system, the point at which the overlay torque is injected will have an effect on the response of the system. The prior art systems either add the torque overlay in at points $T_{ER1}$, $T_{ER2}$ or $T_{ER3}$ (input torque overlay) or $T_{ER4}$ or $T_{ER5}$, (output torque overlay).

It should be noted that the polarity applied is arbitrary and depends on the convention adopted by the external controller generating the overlay torque demand. It is, of course, simple to invert the polarity (for example, add a negative value rather than subtracting a positive one). The polarity used herein has the effect that a positive $T_{ER}$ will tend to reduce the assistance torque and hence increase the torque that the driver has to apply to the steering wheel to maintain a constant force on the road wheels.

The inventors have realised that there are problems with both the input and output torque overlay strategies. This is that the total torque $T_{TOT}$ applied to the steering mechanism—that is the sum of the torque applied by the driver $T_D$ and that applied by the motor $T_A$—does not mimic that which would be naturally produced if the torque demand were generated by a human driver.

This can be demonstrated with respect to FIGS. 4 and 5 of the accompanying drawings. These figures show the ideal static condition, when the dynamic components have settled to their steady state values at a particular value of vehicle speed. The boost curve 400/500 used in both examples is shown as a dotted line. The total effort on the steering column—that is the combined torque due to the assistance of the motor ($T_A$) and the effort applied by the driver ($T_D$) with no external torque request is shown at 402/502. Finally, the output at an arbitrary value of the external torque demand $T_{ER}$ is shown at curve 404/504.

When the same externally requested torque is applied, the input torque overlay strategy (FIG. 4) has a larger effect at higher driver-applied torques $T_D$ than at lower ones. Given that a driver will generally be striving to apply a given force at the wheels and hence keep $T_{TOT}$ constant at a given moment in order to achieve some particular steering effort, the effect of applying a given overlay gives will result in a bigger change in applied torque at high torques than at low torques. This can be seen by comparing differences 406 and 408; for a given $T_{TOT}$, the effect of adding the overlay torque c implies a bigger difference 408 at high torques than the difference 406 at low torques. The feel to the driver of the same applied overlay torque is therefore different depending on what torque they are applying.

The converse is true for output torque overlay as depicted in FIG. 5 of the accompanying drawings. In this case, the effect at lower torques is much more than at higher torques. The difference in the $T_D$ required to achieve the same $T_{TOT}$ through an application of a torque overlay c at low torques 506 is much bigger than at high torques 508. Again, the feel to the driver of the same applied overlay torque is therefore different depending on what torque they are applying.

Figure 6:
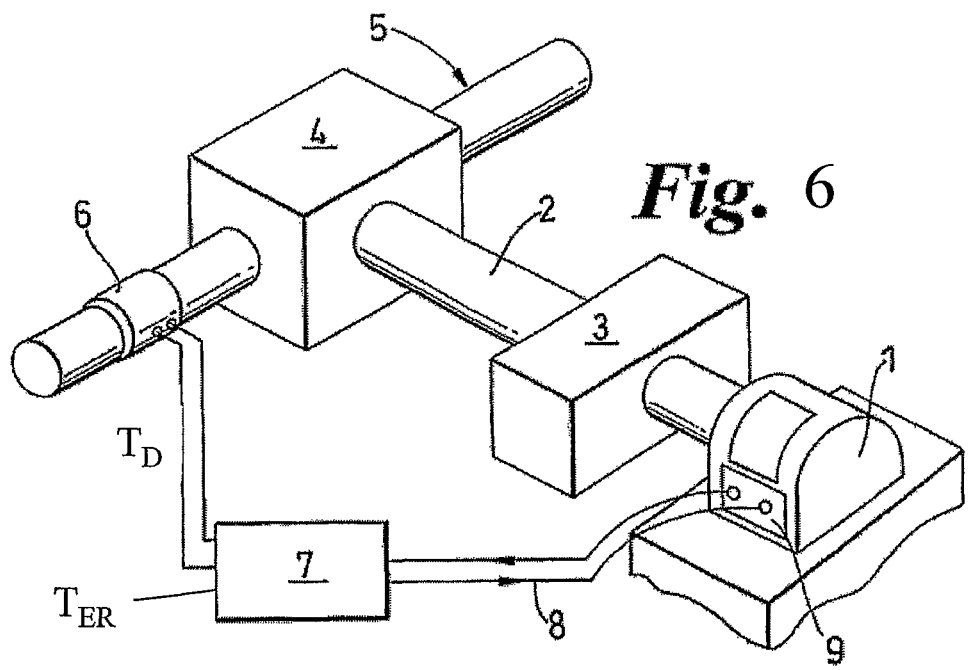
FIG. 6 shows an EPAS system according to an embodiment of the present invention.

The solution according to the present invention is therefore to make the difference in the assistance torque independent of the torque applied by the driver. An embodiment of such a system is shown in FIG. 6 of the accompanying drawings. The EPAS system according to the embodiment of the invention comprises an electric motor 1, which acts upon a drive shaft 2 through a gearbox 3. The drive shaft 2 terminates with a worm gear 4 that co-operates with a wheel provided on a portion of a steering column 5 or a shaft operatively connected to the steering column.

The steering column 5 carries a torque sensor 6 that is adapted to measure the torque carried by the steering column that is produced by the driver of the vehicle as the steering wheel (not shown) and hence steering column is turned against the resisting force provided by the vehicles road wheels (also not shown). The output signal—referred to herein as the torque signal $T_D$—from the torque sensor 6 is fed to a first input of a control unit 7. The control circuit also takes as an input an external torque demand $T_{ER}$.

The control unit 7 acts upon the input signals to produce, as its output, a torque demand signal $T_A$ 8 that is passed to a motor controller 9. The motor controller 9 converts the torque demand signal 8 into drive currents for the electric motor 1. The motor 1 is therefore driven in accordance with the torque demand signal 8.

FIG. 7 of the accompanying drawings shows schematically how the assistance torque $T_A$ is calculated within the control unit 8. In summary, the overlay torque is added to the torque signal $T_D$ both before and after the non-linear boost function is applied to it. Overall, the operation of the calculation is similar to that of FIG. 2 of the accompanying drawings discussed above. The system comprises the same dynamic elements 201, 203 and 204 operating in the same manner. However, the overlay torque is added both as the measured driver torque $T_D$ enters the circuit, before any of the dynamic elements or the boost function 202 have acted on the signal and again after the combined signal has been boosted and the dynamic elements have acted thereupon. In alternatives, the component added before the boost curve can be added at any point in the signal path before the boost curve (hence, points $T_{ER2}$ and $T_{ER3}$ are possible alternatives to the first point shown); similarly the component added after the boost curve can be added anywhere after the boost curve (the later component could equally well be added at point $T_{ER4}$).

Furthermore, as one skilled in the art will appreciate, the dynamic elements may be rearranged into other forms that have a different block structure but are mathematically equivalent.

Using the notation previously used above, and ignoring dynamic effects, the new strategy can be denoted as:

$$T_A = f(T_D - T^{ER}, v) - T_{ER}.$$

The inventors have appreciated that, by applying the overlay torque both before and after the boost function, it is possible to mimic the manner in which the driver applies a torque that is both passed into the system, boosted and provided with assistance (input or driver overlay) and passes through the steering system mechanically to the output (output overlay). This therefore replicates how a driver has to balance the torque he is applying to that which is applied by the EPAS system; the driver feels the same change in torque for a given change in the torque overlay no matter what torque he is applying to the steering wheel.

Figure 8:
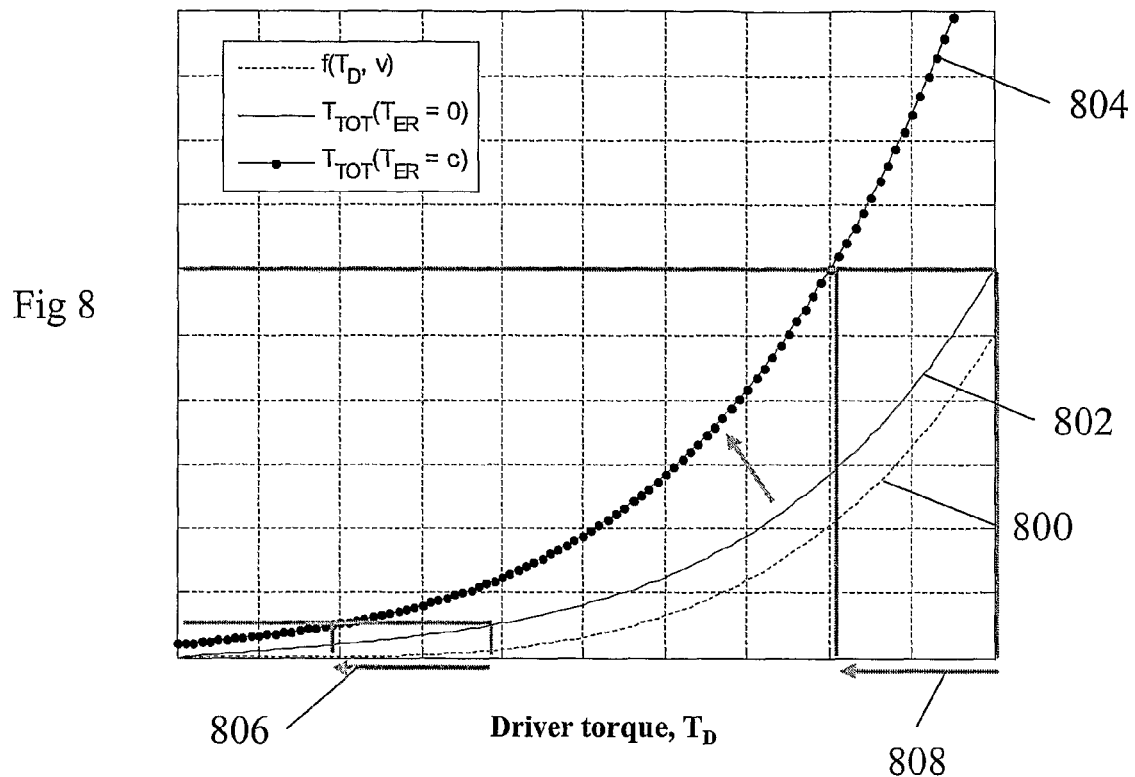
FIG. 8 shows a graph of the response of the EPAS system of the embodiment of FIG. 7.

The effect of this change can be seen in the graph shown in FIG. 8 of the accompanying drawings. In this case, the boost curve 800 is shown as a dotted line. The total torque ($T_A+T_D$) applied to the steering system without any external torque demand is shown by curve 802, and with a constant external torque demand ($T_{ER}=c$) by curve 804. It can be seen graphically that, in order to keep $T_{TOT}$ constant, the same change 806 in applied driver torque $T_D$ is needed at low torque than is needed at high torque 808. Driver feel is therefore consistent for the same change in external torque demand. It is also independent of vehicle speed and the curve of the boost curve.

This can be demonstrated mathematically. With no external torque request:

$$T_{TOT}=T_D+T_A=T_D+f(T_D,v).$$

With an external request added, the driver torque becomes $T_D'$:

$$T_{TOT}=T_D'-T_{ER}+f(T_D'-T_{ER},v)$$

A driver will generally try to keep $T_{TOT}$ equal through the introduction of a torque overlay request. $T_{ER}$ being introduced therefore requires that:

$$T_D=T_D'-T_{ER}, \text{ so } T_D'-T_D=T_{ER}.$$

Therefore, the change in torque that the driver must apply to compensate for the introduction of $T_{ER}$ is independent of $T_D$.

Thus, it is possible to control the torque felt by the driver more accurately.

Figure 9:
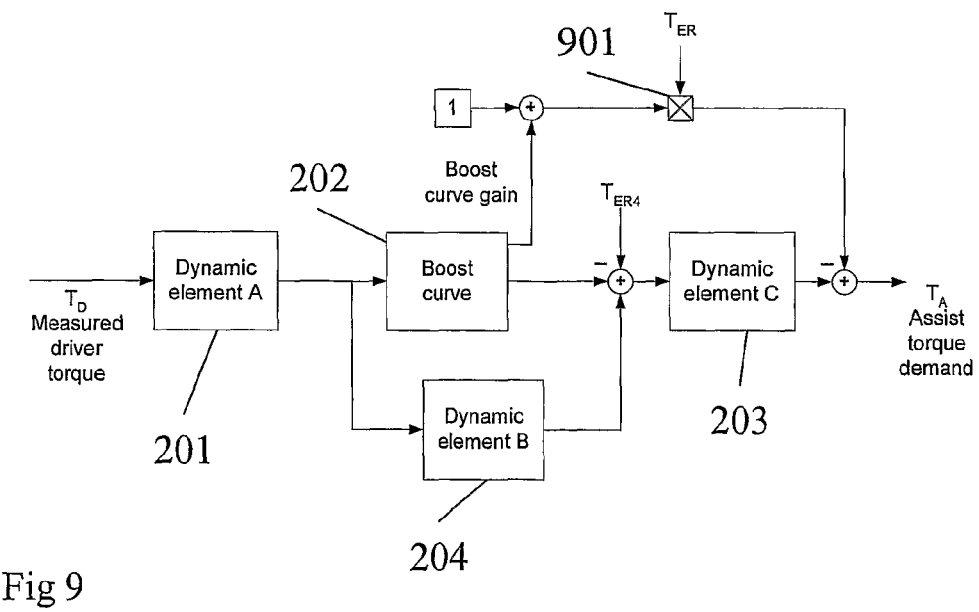
FIG. 9 shows an alternative embodiment of the invention for calculating the assistance torque.

In an alternative embodiment, rather than adding the overlay torque in two places, the torque overlay can be scaled by a function of the gain in the boost curve with respect to applied torque. This is shown in FIG. 9 of the accompanying drawings. In this embodiment, the gain of the boost curve at the relevant driver torque $T_D$ is calculated. This is shown in FIG. 10 of the accompanying drawings. This is the local gradient on the boost curve at the particular value of $T_D$. The gain is added to 1 and the overlay torque is scaled using scaler 901 before being combined additively with the boosted driver torque $f(T_D,v)$ at the output of the calculation. This, similarly to the embodiment of FIG. 7, gives a consistent response to the changes in external torque demand independent of driver torque.

Figure 11:
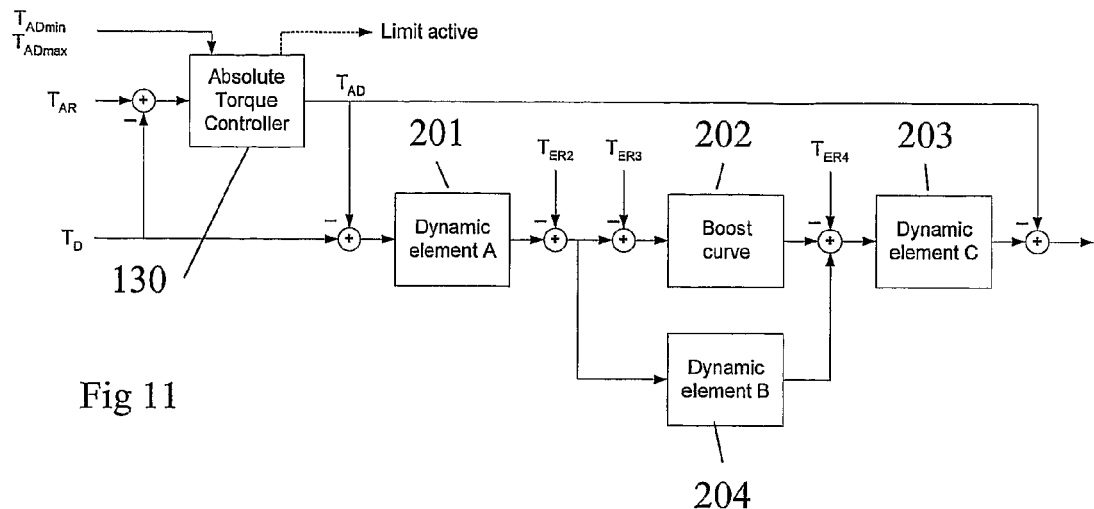
FIG. 11 shows a further embodiment for calculating the assistance torque, based upon an absolute torque demand.

In the embodiments described so far, we have been concerned with introducing a torque change into the system. However, the invention is equally well suited to an external circuit specifying the absolute level of torque to be reacted by the driver. Such an embodiment is shown in FIG. 11 of the accompanying drawings. In this embodiment, a dynamic torque controller 130 takes as inputs the difference between an absolute torque demand $T_{AR}$ and the driver applied torque $T_D$, plus limits $T_{ADmin}$ and $T_{ADmax}$ on the output assistance torque $T_{AD}$. Typically, the control 130 is implemented as a dynamic controller that is designed to be asymptotically stable over the range of possible inputs.

The difference between $T_{AR}$ and $T_D$ is effectively the overlay torque of the embodiment of FIG. 7, as it represents a difference torque to be overlaid on the driver torque $T_D$. However, the absolute torque controller limits the amount of torque that can be overlaid onto the driver's applied torque in each direction, between $T_{ADmin}$ and $T_{ADmax}$. Accordingly, a driver can override such operation.

Once the limited torque overlay $T_{AD}$ has been calculated, the system operates in the same manner as that of FIG. 7. The overlay torque $T_{AD}$ is added both before and after the boost function 202; the "before" and "after" components can be applied in multiple positions as described with reference to FIG. 7.

Figure 12:
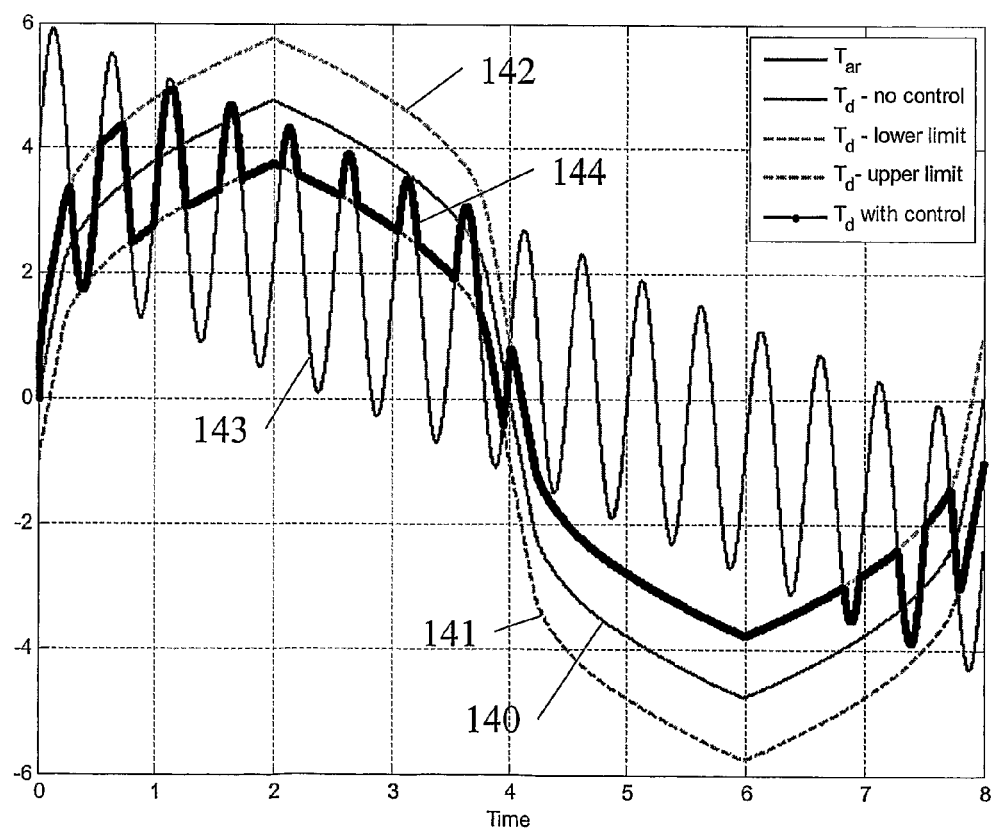
FIG. 12 shows a graph demonstrating the operation of the embodiment of FIG. 11.

The effect of this limited absolute torque control can be seen with respect to FIG. 12. Whilst this graph does not use realistic data, it is useful to show the effect of the embodiment. The effect of the dynamic components is not shown in the graph. However, it demonstrates the workings of the embodiment.

In FIG. 12, a driver is simulated as applying a "load" torque $T_D$ that ramps from 0 to 20 at t=2, back through zero to −20 at t=6 and back to zero at t=8. The driver-applied torque is depicted at 140. The limits on $T_{AD}$ are set at ±1, which leads to limits on $T_{AD}$ shown at 141 and 142. An absolute torque demand $T_{AR}$ is shown a sinusoidal force varying according to trace 143. The resultant assistance force $T_A$ is shown at trace 144 (the dark line).

As can be seen, the system faithfully tracks the demanded torque $T_{AR}$ whilst it is within the limits 141, 142 of $T_D$. Otherwise, it tracks the relevant limit; the driver consistently feels a limit's worth of bias in the appropriate direction. This bias is independent of $T_D$; the feel of the system is therefore consistent once more. We have found that in systems with only input or output absolute but limited torque overlay either the limits or the absolute torque value are not tracked accurately.

We have also appreciated that by setting the limits to zero, the effects of the absolute torque demand are disabled. This is a particularly convenient and simple method of disabling absolute torque control.

Figure 13:
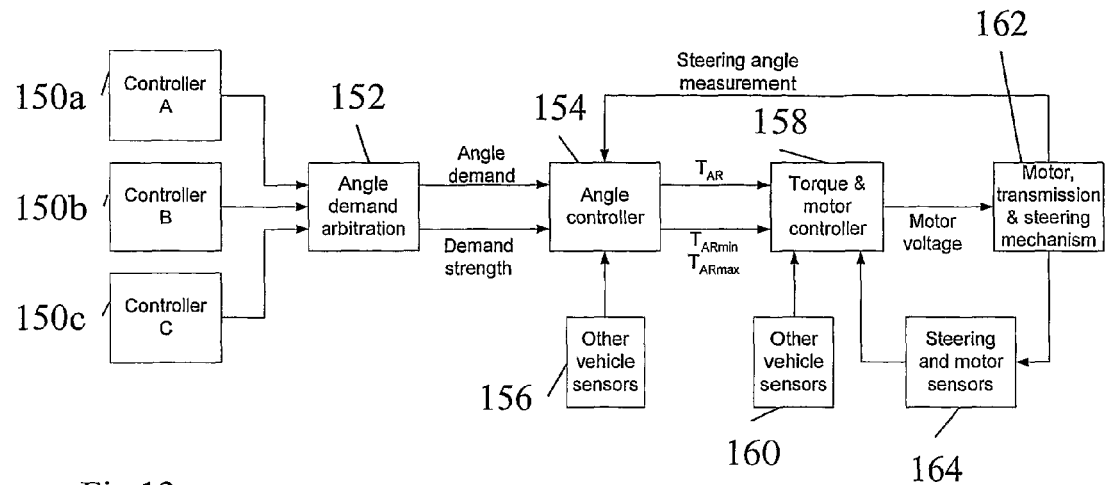
FIG. 13 shows a further embodiment, based upon absolute angle control.

In an extension to this absolute torque control, the invention can also be used to implement absolute angle control. This is where an external circuit demands that the wheels be pointed at a certain angle. An embodiment of such a system is shown in FIG. 13 of the accompanying drawings.

In this embodiment, multiple controllers 150a,b,c external to the EPAS system have possibly conflicting angle demands of the EPAS system. For example, controller 150a may be a parking controller, controller 150b a roll stability controller and controller 150c an autonomous guidance system or a collision avoidance system. Each transmits an angle demand, indicative of the angle at which the controller wishes to point the wheels, and a demand strength, indicative of how important it is that the wheels be pointed in line with the demand. These signals are transmitted to angle arbitration unit 152.

This arbitration unit 152 takes all of the angle demands and selects from those demands an appropriate angle and an overall demand. The circuit is responsible for judging the highest priority and setting the overall angle based thereupon. Furthermore, it also sets the overall demand strength based on the priorities sent to it, whether they conflict and so on.

The angle and strength thus generated are passed to angle controller 154. Based upon the angle demanded and the strength of the demand, the controller sets an absolute torque demand $T_{AR}$ and limits $T_{ARmin}$ and $T_{ARmax}$ as discussed with reference to FIG. 11. The strength of the demand will determine the limits on the torque; a higher strength means that it is more important that the torque demand is achieved and so merits wider limits, whereas an unimportant demand should be able to be overridden by the driver of the vehicle easily.

The angle controller 154 controls the torque demand based upon the difference between the current steering angle (determined from other sensors of the vehicle 156) and the desired steering angle and sets the torque demand to achieve the angle required to minimize the angle error. This may be done using a time-dependent compensator such as a PID controller. The limits on the torque may be set based on any of:

the vehicle speed, as determined from the vehicle speed sensor 156;
time, for example by integrating the demand strength over a moving time window;
demand strength as discussed above; and
angle demand, for example by biasing the limits based upon the direction of the angle demand.

If the demand strength is zero, the limits can be set to zero, which disables the absolute torque control and so the absolute angle control as discussed above.

If the angle controller has an integrating element (such as a PID controller), then the limiting function may be fed back to prevent integrator wind-up.

Once the torque demand and limits have been calculated, the method passes these to the torque and motor controller 158, which operates the method of the embodiment of FIG. 11 to apply the appropriate torques to the motor etc 162. Feedback from the motor sensors 164 is used to control the motor correctly as is well known in the prior art, as well as using the output of other sensors such as vehicle speed sensor and the like 160.

Whilst the embodiments described above generally have the advantage that the torque overlay is applied so that the feel is consistent, it can still be desired to provide the facility to provide "output torque overlay"; that is, being able to apply an overlay torque to points $T_{ER4}$ or $T_{ER5}$ in FIG. 2 with the effect shown in FIG. 5. This is because an EPAS system will be interacting with other systems in a vehicle, some of which may be arranged to output an output torque overlay. For interoperability, the opportunity to provide both output torque overlay and flexibility of the above embodiments can be achieved.

Furthermore, it is always required to consider safety when considering the design of EPAS systems. Rather than perform a full system analysis of the controlling function of an EPAS system, it is desired to simply limit the magnitude of the torque overlaid on the user assistance to a non-hazardous amount. This means that a user can always overcome the overlay torque and can counteract any possibly hazardous behaviour.

Figure 14:
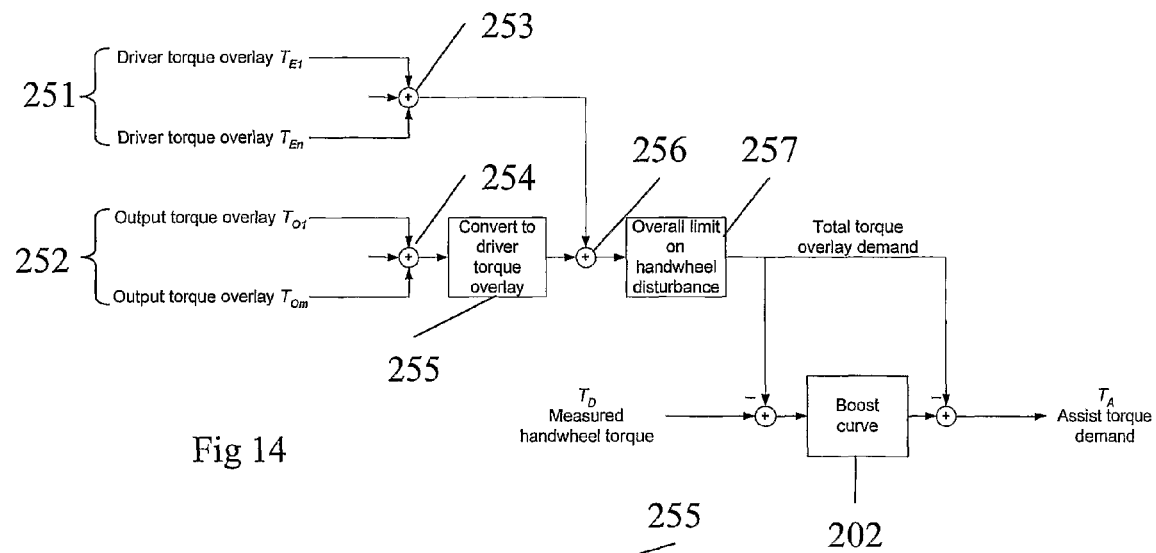
FIG. 14 shows an a block diagram of an embodiment of the invention where multiple equivalent overlay torques are simulated.

To simulate the effect of an output torque overlay, the assistance torque can be calculated according to the embodiment of the invention shown in FIG. 14 of the accompanying drawings. In this and the following embodiments, the effects of the dynamic elements are disregarded, but they could be included as with the preceding embodiments.

In this embodiment, a plurality of "driver torque overlays" 251—that is, overlays that are to be applied according to the embodiment of FIG. 7—are combined together by adder 253. Similarly, a plurality of "output torque overlays" 252—that is, overlays that are to be added independent of the effect of the boost curve—are added together by adder 254. The driver torque overlays are referred to generically as $T_E$ and individually as $T_{E1}$ to $T_{En}$, whereas the output torque overlays are referred to generically as $T_O$ and individually as $T_{O1}$ to $T_{On}$.

As discussed above, the output torque overlay scheme is discussed above with respect to FIG. 2. In this case, output torque overlay involves adding a torque at points $T_{ER4}$ or $T_{ER5}$; ignoring the dynamic effects the two points are equivalent. Driver torque overlay is discussed above with respect to FIG. 7. From above, the driver torque overlay case gives us:

$$T_A = f(T_D - T_E) - T_E$$

whereas the output torque overlay gives:

$$T_A = f(T_D) - T_O$$

In order to simulate the effect of output torque overlay using the system of FIG. 7, the appropriate value of driver torque overlay $T_E$ that gives an effect equivalent to a output torque overlay of $T_O$ can be found by equating $T_A$ in the two equations, taking $T_D$ as the driver input:

$$T_A = f(T_D - T_E) - T_E = f(T_D) - T_O \Rightarrow T_O = f(T_D) - f(T_D - T_E) + T_E$$

This last equation can be inverted in order to find $T_E$. However, this requires finding the inverse of the boost function f(T).

The boost curve may be implemented as a piece-wise linear and quadratic function, or as a lookup table, or in another fashion. In general, calculating the inverse of such a nonlinear function requires the same or more computational power than calculating the standard boost curve.

Accordingly, the output of adder 254 is passed to a conversion unit which converts the input output torque demand into a equivalent overlay torque demand according to the formula above.

This equivalent overlay torque demand is added at adder 256 to the output of adder 253 to generate a total torque overlay demand. In order to ensure that the overlay torque has a maximum magnitude that ensures that hazardous situations are unlikely to occur, the total torque overlay demand is passed through a limiter 257, which restricts the magnitude of that signal to a predetermined maximum. The limited total is then processed as a torque overlay in the sense of FIG. 7 using boost curve 202 to generate an assistance torque $T_A$.

The solution for $T_E$ is a relatively complicated equation. Although it can be simplified under some conditions, it is concluded that it may be undesirable to implement this solution in a fixed-point controller.

In order to avoid having to invert f(T), an approximation to the inverse of the boost curve can be used. We have from above:

$$T_O = f(T_D) - f(T_D - T_E) + T_E$$

Using a first order approximation to the boost curve:

$$f(T_D - T_E) \approx f(T_D) - gT_E$$

where g is the gain of the boost curve at $T=T_D$. Then:

$$T_O \approx f(T_D) - \{f(T_D) - gT_E\} + T_E$$

$$\approx (1+g)T_E$$

Hence:

$$T_E \approx \frac{T_O}{1+g}.$$

The gain of the boost curve can be found by differentiation or using a pre-calculated lookup table.

Figure 15:
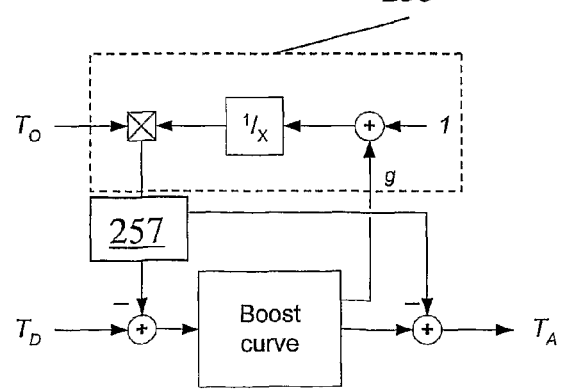
FIG. 15 shows a block diagram depicting a further embodiment of the invention, making use of an approximation to the simulation of equivalent overlay torques.

An embodiment of the invention using this approximation can be seen in FIG. 15 of the accompanying drawings. For simplicity, the diagram omits the details of FIG. 14 relating to the driver torque overlays to concentrate on the conversion unit 255; the remainder of the circuit is the same as in FIG. 14. The conversion unit 255 takes as an input the gain g of the boost curve at the operating point $T_D$ (the driver-applied torque). The conversion unit then applies $$T_E \approx \frac{T_O}{1+g}.$$

The output of this circuit is passed to a limiter 257 as in the previous embodiment; any dual overlay torque demands can be added at this point. The output of the limiter 257 is then processed by the boost curve 202 as a dual overlay torque in the manner of FIG. 7.

A further embodiment is shown in FIG. 16 of the accompanying drawings. This uses two identical boost curves 202a and 202b to cancel out the effects of the boost curve on the output torque overlay components.

Consider first the case where there are no driver torque overlay components ($T_E=0$) and the limits are not active. Accordingly:

$$T_A = f(T_D - b) - b$$

$$b = d = T_O + f(T_D - b) - f(T_D)$$

Substituting for b gives:

$$T_A = f(T_D - b) - T_O - f(T_D - b) + f(T_D)$$
$$= f(T_D) - T_O$$

Thus the overlay torque is applied correctly. The effect of boost curve 202b on the output torque overlay $T_D$ is normally cancelled out by the boost curve 202a. However, when the limiter 257 on b, the output of the boost curve 202a is active, the overlay torque is limited in terms of the driver torque, and boost curve 202b operates in the usual fashion on the driver torque as offset by the limited overlay torque.

Adding now a driver torque overlay demand $T_E$:

$$b = T_O + f(T_D - d) - f(T_D - T_E)$$

$$d = b + T_E$$

Substituting for b and d gives:

$$T_A = f(T_D - d) - d$$
$$= f(T_D - d) - b - T_E$$
$$= f(T_D - d) - T_O - f(T_D - d) + f(T_D - T_E) - T_E$$
$$= f(T_D - T_E) - T_E - T_O,$$

which is the desired result.

When the limiter 257 is active at $T_{lim}$:

$$T_A = f(T_D - T_{lim}) - T_{lim};$$

that is, the system operates as if it were under a constant driver torque overlay of $T_{lim}$.

Figure 17A:
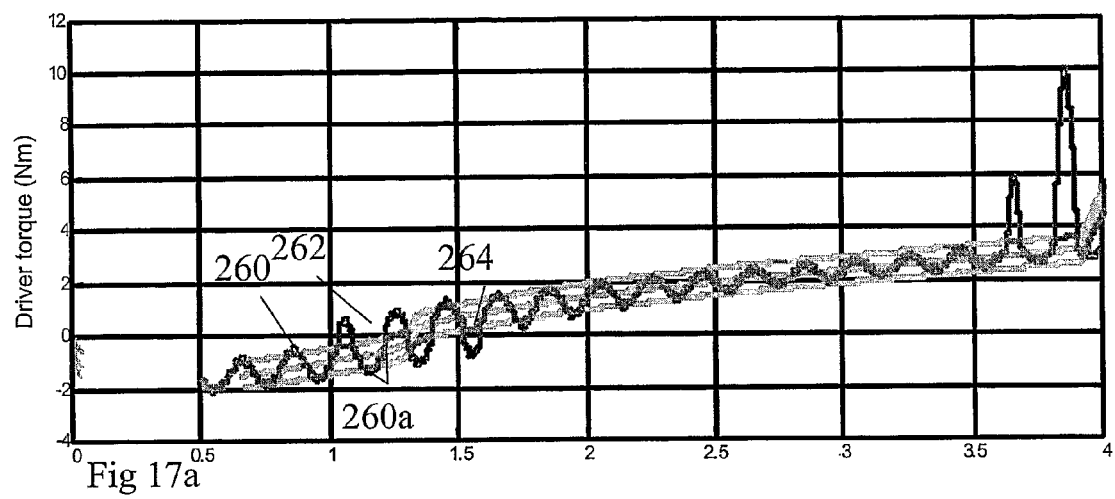
FIGS. 17a to 17c show a set of graphs depicting simulated behaviour of the embodiment of FIG. 16.
Figure 17B:
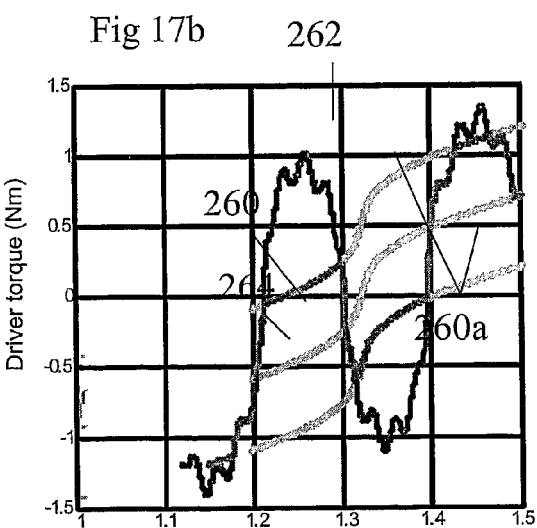
Figure 17C:
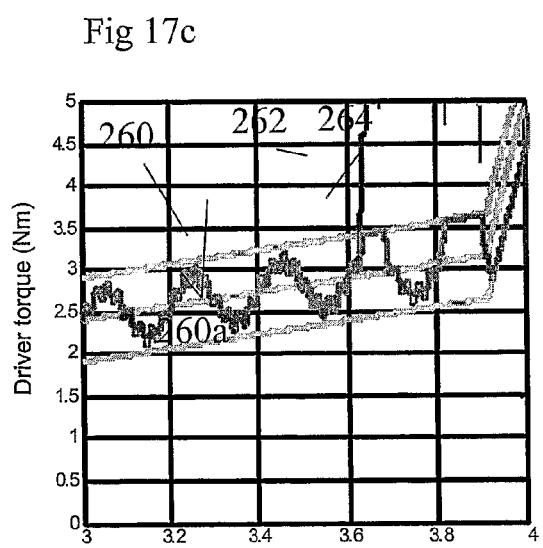

The results of a simulation of this embodiment can be seen in FIGS. 17a to 17c of the accompanying drawings. The conditions for the simulation are:

The driver torque ($T_D$) is ramped between two extreme values to drive the boost curve into saturation on the lower and upper bound. This is shown in FIGS. 17a to 17c as trace 260.

The limiter 257 was set to a maximum of ±0.5 Nm; the limits of the driver torque plus or minus the limit are shown as traces 260a.

The output overlay torque is driven with a sine wave, amplitude 8 Nm and frequency 5 Hz.

The dual torque overlay is driven with a sine wave, amplitude 0.1 Nm and frequency 40 Hz.

The response of the system is shown as trace 264. Note that the inputs are chosen to show the static response; they are not intended to be representative of true inputs. FIGS. 17a to 17c also show as trace 262 an unlimited torque assistance signal comprising the addition of the assistance torque overlaid according to the scheme of FIG. 7 with the dual torque overlay input, to which is simply added the output overlay torque. Accordingly, the ideal result would be the trace 262 limited against limits 260a.

As can be seen, the results of the simulation—trace 262—accurately tracks the reference trace 264 within the limits 260a but does not substantially stray outwith. This is a good result.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method of controlling an electric motor in an electric power assisted steering system, the motor being arranged so as to apply a force to part of a steering mechanism of a vehicle, the method comprising the steps of:
   calculating a force demand indicative of an assistance force dependent upon a torque applied by a user to the steering mechanism that is to be applied to the steering mechanism to reduce the exertion required by the user to steer the vehicle;
   combining the force demand with an overlay force demand, the overlay force demand being indicative of a force which is desired to overlay over the assistance force, to generate a combined assistance force; and
   controlling the electric motor according to the combined assistance force, such that together with a force applied by the user, a total force is applied to the steering mechanism, wherein, in order to generate the combined assistance force,
   the torque applied by the user is subjected to a non-linear boost function, and further wherein
   the overlay force demand is combined with the force demand such that, for an arbitrary change in the overlay force demand, a change in the total force is independent of the torque applied by the user over a range of torques applied by the user.

2. The method of claim 1 wherein the overlay force demand includes a first component and a second component and further wherein the step of generating the combined assistance force comprises includes:
   combining the torque applied by the user with the first component of the overlay force demand to form a first intermediate value;
   applying the non-linear boost function to the first intermediate value to form a second intermediate value; and
   combining the second intermediate value with the second component of the overlay force demand.

3. The method of claim 2 wherein at least one of the combinations of the user-applied torque and the first component of the overlay force component on the one hand and the second intermediate value and the second component of the overlay force component on the other hand comprise additively combining the values to be combined.

4. The method according to claim 2, wherein the method also includes calculating the combined assistance force dependent upon a output overlay demand indicative of a further force which it is desired to overlay over the assistance force and the force due to the overlay force demand, such that, for an arbitrary change in the output overlay demand, the change in the total force is substantially independent of the non-linear function and further wherein the method also includes converting the output overlay demand to an equivalent overlay force demand and combining that with the overlay force demand before the overlay force demand is used to determine the first and second intermediate values, such that the equivalent overlay force demand represents the change in the overlay force demand necessary to generate change in the total force that is independent of the non-linear function.

5. The method of claim 4, wherein the equivalent overlay force demand represents the change in the overlay force demand necessary to generate change in the total force that is independent of the non-linear function.

6. The method of claim 1 wherein the overlay force demand represents a force that is to be added or subtracted from the assistance force that would otherwise be generated from the user-applied torque.

7. The method of claim 1 wherein the overlay force demand includes an override force value to be applied to the steering mechanism independent of the torque applied by the user.

8. The method of claim 7 wherein the method also includes a step of comparing the torque applied by the user and the override force value and limiting a difference between the override force value and the user-applied torque to a difference limit.

9. The method of claim 8 wherein the step of determining the override force value is dependent upon a desired steering angle demand for the steering mechanism.

10. The method of claim 9 wherein the driver of the vehicle can override the desired steering angle demand.

11. The method of claim 10 wherein the driver of the vehicle will feel a maximum bias equivalent to the limit when the steering angle demand is overridden.

12. The method of claim 9, wherein the desired steering angle has an overall demand strength associated therewith and in which the limit depends on the overall demand strength.

13. The method of claim 12 wherein the difference limit is set to zero when the overall demand strength is zero to disable the override force.

14. The method of claim 9 wherein the limit on the override force is non-symmetrical and is biased according to a direction of the desired steering angle relative to an actual steering angle.

15. The method of claim 9 further including a step of combining a plurality of different desired steering angles to form the desired steering angle.

16. The method of claim 15 wherein each of the different desired steering angles has a demand strength associated therewith; the method further including a step of determining the overall angle demand strength based on the demand strengths of the angle demands.

17. The method of claim 8 further including a step of varying the difference limit by setting the difference limit to zero when it is desired to disable the control of the combined assistance force by the override force value.

18. The method of claim 1, further including a step of limiting the difference between the assistance force and the total force.

19. The method of claim 1 in which the step of generating the combined assistance force includes applying a scaling factor to the overlay force demand that is dependent upon a rate of change of the boost function with respect to the torque applied by the user before the overlay torque demand is combined with the torque applied by the user.

20. The method of claim 1 wherein the method includes calculating an overlay force based upon the overlay force demand and the measured driver torque.

21. The method of claim 20, wherein the overlay force is combined with the torque applied by the user and further wherein a non-linear boost function is applied to the combination of the overlay torque and the torque applied by the user.

22. The method of claim 21 wherein the user applied torque is the subject of the non-linear boost function before the calculated overlay force is combined with the boosted user applied torque.

23. The method of claim 1 wherein the overlay force demand is independent of the torque the user is applying to the system.

24. The method of claim 1, wherein the method also includes calculating the combined assistance force dependent upon a output overlay demand indicative of a further force which it is desired to overlay over the assistance force and the force due to the overlay force demand, such that, for an arbitrary change in the output overlay demand, the change in the total force is independent of the non-linear function.

25. An electric power assisted steering system comprising:
a steering wheel;
a steering mechanism which operatively couples the steering wheel to road wheels of a vehicle;
an electric motor that applies a force to part of the steering mechanism;
a torque sensor that provides a torque signal indicative of a torque carried by part of the steering mechanism; and
a control unit that controls the motor by generating a force demand signal indicative of an assistance force, dependent upon the torque signal, that is to be applied to the steering mechanism to reduce an exertion required by a user to steer the vehicle,
the control unit having an input for the torque signal and an input for an overlay force demand signal being indicative of a force which it is desired to overlay over the assistance force,
the control unit including a boost unit that applies a non-linear boost function to the torque signal, and
the control unit also combining the torque signal and the overlay force demand signal to create a combined assistance force signal so as to control the electric motor such that a total force including the combined assistance force and the force applied by a user is applied to the steering mechanism such that, for an arbitrary change in the overlay force demand signal, the change in the total force is independent of the torque applied by the user over a range of values of the torque applied by the user.

26. The electric power assisted steering system of claim 25 wherein the control unit includes:
a first combination circuit that combines the torque signal with a first component of the overlay force demand signal to form a first intermediate signal;
a boost circuit that applies the non-linear boost function to the first intermediate signal to form a second intermediate signal; and
a second combination circuit that combines the second intermediate signal with a second component of the overlay force demand signal.

27. The electric power assisted steering system of claim 25 wherein the overlay force demand signal represents a force that is to be added or subtracted from the assistance force that would otherwise be generated from the user-applied torque.

28. The electric power assisted steering system of claim 27 wherein the control unit also includes an override force signal calculating circuit having an input for a desired steering angle and that calculates the override force value for the steering mechanism dependent on the desired steering angle.

29. The electric power assisted steering system of claim 28 wherein the system further includes a steering angle sensor that generates a steering angle signal that is dependent on a steering angle of the vehicle and further wherein the control unit includes an angle differencing circuit that takes as inputs the steering angle signal and the desired steering angle and to calculate and output a angle difference signal indicative of the difference between the desired steering angle and the actual steering angle of the vehicle and the override force calculating circuit has an input for this signal so as to use the signal in calculating the override force value.

* * * * *